Jan. 20, 1959 D. L. WILKERSON 2,869,570
AIR LINE AUTOMATIC DRAIN VALVE
Filed Oct. 1, 1954
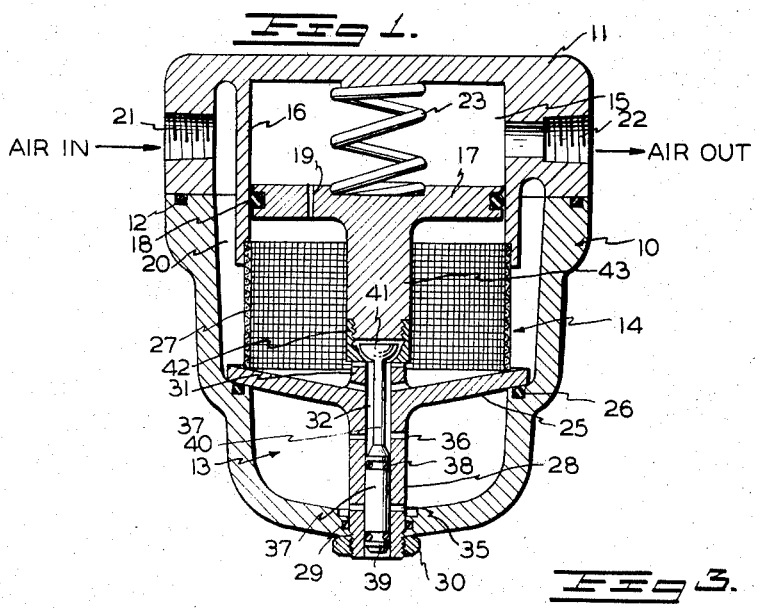
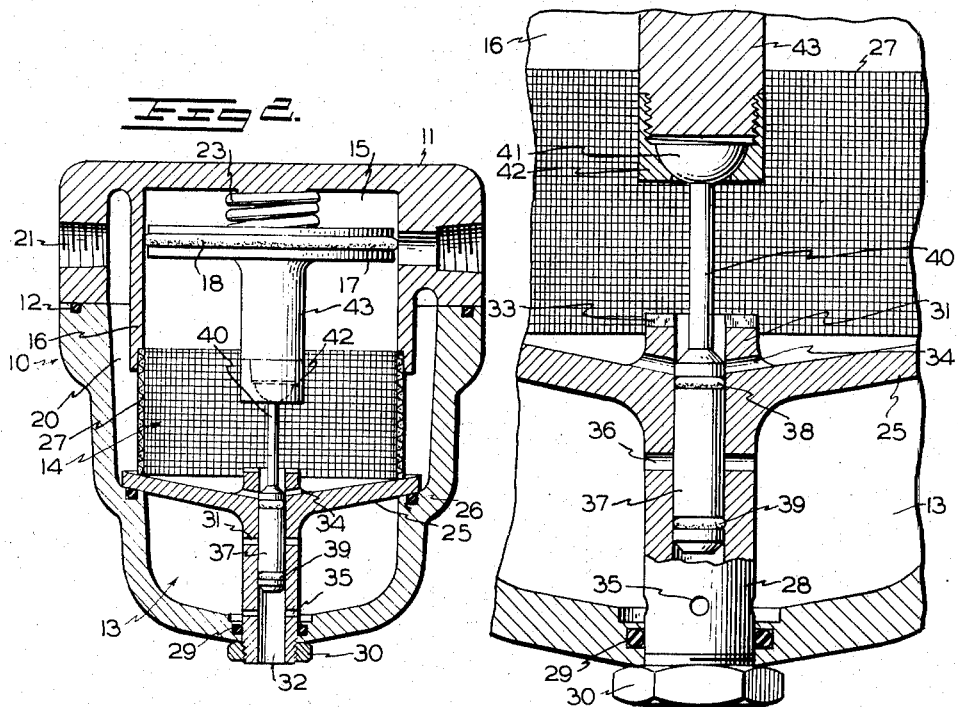
INVENTOR.
DEWEY L. WILKERSON
BY

United States Patent Office 2,869,570
Patented Jan. 20, 1959

2,869,570

AIR LINE AUTOMATIC DRAIN VALVE

Dewey L. Wilkerson, Denver, Colo., assignor to Wilkerson Corporation, Englewood, Colo., a corporation of Colorado Application October 1, 1954, Serial No. 459,699

10 Claims. (Cl. 137—204)

This invention relates to the cleaning of air in compressed air lines to remove moisture, dirt, oil, sludge and other contaminants therefrom; and is an improvement with respect to certain aspects of the valve disclosed in my United States Patent 2,619,106 of November 25, 1952.

The present invention is designed for use in air lines and systems wherein compressed air is drawn from a line at intervals, as in the operation of pneumatic tools, air brakes, and various appliances which draw air from a supply line or system at each operation and thus bring about fluctuation of air pressure therein.

An object of the invention is to provide a valve adapted for coupling in a comperssed air line and which functions automatically in response to operating pressure variations therein to remove moisture from air passed through the valve, and to expel the separated matter to the atmosphere in the vicinity of the valve.

Another object is to provide a valve of the character indicated having means for forcibly expelling the separated matter from the valve by air delivered from the valve at line pressure and without influencing pressure conditions extending within the valve during the expulsion.

A further object is to provide an improved valve of the character described in which axially aligned elements movable in unison are coupled by universal joint means to compensate for any imperfection in their concentricity that may exist.

Other objects will be apparent to those skilled in the art.

In the accompanying drawings:

Figure 1 is substantially a central vertical sectional view through a valve embodying the invention, with the valve in parts in the positions they assume when the air pressure at opposite sides of the movable wall is equal;

Figure 2 is a view similar to Figure 1 but illustrating the positions assumed by the parts when air is drawn from a line in which the valve is coupled;

Figure 3 is an enlarged fragmentary detail view of the lower portion of the valve with the parts in their Figure 2 position.

The valve includes an air expansion chamber, a sump chamber opening therefrom at its bottom and having a discharge port to the atmosphere, and an air discharge chamber above the expansion chamber and separated therefrom. Compressed air under line pressure enters the expansion chamber and passes to the discharge chamber from which it is withdrawn for the accomplishment of work. In the expansion chamber the air gives up its moisture which settles at the bottom and drains into the sump, from which it is expelled to the atmosphere substantially under line pressure whenever the valve is actuated.

In the embodiment of the invention disclosed herein the valve is housed within a generally cylindrical two-part casing comprising a body 10 and a top cover 11 clamped together by suitable means, not shown, and sealed by a ring gasket 12. The body portion 10 is internally stepped and is closed at its lower end to provide a sump chamber 13 and a superimposed air expansion chamber 14 of larger internal diameter which opens at its upper end into an air discharge chamber 15 in the cover 11. This chamber 15 is comprised within a central depending sleeve 16 integral with the cover and is separated from the chamber 14 by a wall 17 that is movable axially within the sleeve 16 in response to pressure differential between the air expansion and air discharge chambers.

As here shown, the movable wall 17 is constituted by a piston reciprocable in the cylinder formed by the sleeve and carrying a peripheral packing 18, preferably an O-ring of rubber or the like. A small bore bleed passage 19 through the head of the piston provides a normal restricted communication between the chambers 14 and 15 for pressure equalization when the valve is not actuated.

The sleeve 16 is spaced from the surrounding wall of the casing and extends downwardly well into the air expansion chamber 14 to provide an annular air channel 20 in the cover and upper end of the air expansion chamber. This channel is in open communication with an air inlet port 21 through the cover wall, which port is adapted for service connection with the upstream side of a compressed air line, not shown. An air discharge port 22 through the cover wall communicates with the air discharge chamber 15 at a point substantially midway between the top wall of the cover and the upper face of the piston 17 when the latter is in its normal inactivated position. The port 22 connects with the downstream side of the air line. An expansion spring 23 between the top wall of the cover and the piston provides a means biasing the piston to its lowermost or inactivated position.

A dished partition 25 separates the sump 13 from the air expansion chamber 14 and seats at its marginal edge portion against a sealing gasket 26 carried by the annular shoulder resulting from the stepped formation of the casing body wall. The upper face of the partition supports the base of a cylindrical filter screen 27 of very fine mesh which has its top edge positioned in the rabbeted lower end of the sleeve 16 so that it is detachably held between the sleeve and the partition. A tubular stem 28 integral with the partition 25 extends downwardly therefrom on the vertical axis of the valve casing and passes at its lower end through the bottom wall of the sump 13 in sealed engagement therewith, as by an O-ring seal 29. The lower end of the stem projects externally of the sump wall and has threaded engagement with a nut 30 through the agency of which the partition is drawn down into tight sealing engagement against the shoulder gasket 26. An axial prolongation 31 of the stem 28 extends above the upper face of the partition at its low point and is castellated at its upper end.

An axial drain bore 32 extends entirely through the stem 28 and its prolongation 31. It opens at its upper end into the air expansion chamber 14 and at its lower end to the atmosphere externally of the sump. The castellated configuration of the stem prolongation 31 provides radial channels 33 which open to the drain bore; and a series of radial drain passages 34 extend through the base of the prolongation, opening from the low point of the dished upper face of the partition at a downward inclination into the bore 32. The stem 28 is provided with a series of radial drain passages 35 opening from the low point of the sump chamber into the stem bore and is further provided with an intermediate series of radial drain passages 36 opening from the stem bore into the sump chamber at a level somewhat below the partition 25.

Within the partition stem 28 the respective series of drain passages 35 and 36 are alternately opened and closed by control valve means 37 operative in response to pressure differential in the air chambers 14 and 15.

The control valve means, in the form here disclosed, comprises a double acting cylindrical plug of a diameter sufficient to effect a snug but free sliding fit in the bore 32. The upper end portion of the plug, which controls the drain passages 36, mounts a packing and sealing ring 38, preferably an O-ring of rubber or other suitable material, and a similar ring 39 is mounted on the lower end portion of the plug to control the sump drain passages 35. The axial extent or length of the plug is such that when one set of drain passages is open the other is closed. The axial distance between the rings 38 and 39 is so dimensioned relative to the axial distance between the two sets of drain passages that one set is fully closed before the other set begins to open. In effect, the rings constitute a pair of oppositely acting and simultaneously operating valves, one of which is always closed while the other is open, and both of which are closed simultaneously for an interval of time before either is opened. Both cannot be open at the same time.

The control valve means 37 is operated from and by the piston 17 by means of a connection consisting of a valve operating rod 40 rigidly secured to the upper end of the valve plug and extending upwardly into the expansion chamber 14 on the axis of the valve casing. At its upper end the rod carries a semi-spherical head 41 seated in a ball socket collar 42, threaded onto the lower end of an axially depending stem 43 that is integral with the piston. The socket portion of the collar 42 is spaced axially from the end of the piston stem 43 to provide a slight clearance enabling the universal joint coupling to function for self-alignment of the valve rod and piston stem when concentricity of these elements is not perfect. This is a highly important feature of the invention as it prevents binding of the piston ring 18 and the valve plug rings 38 and 39.

When the valve is inactive pressure in the chambers at opposite sides of the movable wall 17 is equal and the parts assume their positions as shown in Fig. 1, with the collar seated on the abutment constituted by the castellated prolongation 31 which is, in effect, a stop on the partition 25 to determine the lower limit position of the movable wall.

In operation, when air is drawn through the outlet 22 the pressure in chamber 15 is correspondingly reduced and the higher pressure in chamber 14 forces the wall upwardly, compressing the spring 23 and correspondingly lifting the valve plug 37. As the valve plug moves up the ring 38 closes off the drain passages 36 and cuts off communication between the sump chamber 13 and the air chamber 14 which normally is open through the bore 32 around the valve rod 40. Continued upward travel of the valve plug then lifts the ring 39 above the sump drain passages and opens the sump to the bore 32 for expulsion to the atmosphere of matter collected in the sump. As the wall 17 continues upward it passes completely or partly above the outlet port 22, depending on the C. F. M. used, allowing practically full normal flow of air at line pressure through the valve. When flow of air through the outlet 22 is stopped the wall 17 moves downwardly in response to the bias of spring 23 and the valve plug 37 moves correspondingly, first to close the sump discharge outlet at the passages 35 and then to open communication between the air chamber 14 and the sump 13 at the passages 36. The movable wall 17 continues its downward movement until arrested by engagement of the joint collar 42 against the top of the abutment constituted by the prolongation 31, at which time the wall 17 will have passed below the outlet 22 to close off the down stream side of the line.

As air enters through the inlet port 21 it impinges against the baffle formed by the sleeve 16 and flows down through the channel 20 into the expansion chamber 14. In chamber 14 the air passes through the strainer screen 27 which, because of its very fine mesh, slows down the air flow enough to equalize its passage therethrough. This slow down movement is sufficient to prevent moisture from being carried upward to the outlet 22; instead, the moisture drains down onto the partition 25 and through passages 34 where it is blocked by the elevated valve plug 37 as shown in Figs. 2 and 3. When the valve plug moves down following cessation of air flow through the outlet 22 it first closes off the sump from the atmosphere and then opens communication between the passages 34 and 36 through the bore 32, whereupon moisture collected on the portion 25 drains into the sump chamber where it remains until expelled therefrom by air at line pressure trapped in the sump chamber by the next following actuation of the valve.

It is to be understood that the present disclosure is illustrative, not restrictive. Any desired changes and modifications consistent with the scope of the invention as claimed may be made in the details of the structure herein shown.

I claim:

1. A compressed air line drain valve comprising a casing having therein an air inlet, an air outlet, and a wall separating the casing into an air expansion chamber in communication with the air inlet and an air discharge chamber in communication with the air outlet, said wall being movable in response to service air pressure reduction in the air discharge chamber to open full air flow communication between the air inlet and the air outlet, means biasing said wall to a position preventing full air flow communication between the air inlet and the air outlet under conditions other than a service reduction of air pressure in the air discharge chamber, a partition in the air expansion chamber spaced above the casing bottom to provide in conjunction therewith a sump beneath the partition, said partition having a dished upper face providing a moisture collecting bottom for the air expansion chamber and having further a depending stem extending through the sump and projecting through the sump bottom externally of the casing in fluid tight sealed engagement with the sump bottom, said stem having an axial drain bore open to the atmosphere through the external end of the stem and open to the air expansion chamber at substantially the low point of the dished moisture collecting face of said partition, a pair of axially spaced drain passages through the stem in the sump establishing communication between the stem bore and the sump, valve means reciprocable in the stem bore for alternate control of said drain passages, and an operating connection between said movable wall and the valve means for actuating the latter in response to movement of the wall.

2. In the structure of claim 1, said operating connection including a universal joint coupling.

3. A compressed air line drain valve comprising a substantially cylindrical casing body having a closed bottom and an open upper end, a cover over said open upper end in fluid tight sealed engagement therewith, a cylindrical sleeve depending from said cover axially into the interior of the casing body, an air inlet in the cover opening therein externally of the sleeve, an air outlet in the cover opening therein internally of the sleeve, a piston in said cylindrical sleeve forming with the cover an air discharge chamber in communication with the air outlet and forming with the casing body an air expansion chamber in communication with the air inlet, means biasing the piston to a position normally preventing full free air flow between the air inlet and the air outlet, said piston being movable against its bias in response to a service reduction of air pressure in the air discharge chamber to a position establishing full free air flow between the air inlet and the air outlet, a moisture collecting partition in the casing body intermediate the lower end of the cover sleeve and the casing bottom and forming with said bottom a sump, said partition having a depending stem projecting externally of the casing body through its bottom in fluid tight sealed engagement therewith, said stem having an axial drain bore open to the atmosphere through the external projection of the stem and open to the air expansion chamber above the partition, a pair of axially spaced drain passages through the stem in the sump establishing communication between the stem bore and the sump, a cylindrical valve plug of greater axial extent than the axial space between said stem drain passages, said valve plug being reciprocable in the stem bore for alternate control of the drain passages, a valve operating rod of smaller diameter than the valve plug attached to the upper end of the plug and extending upwardly through the stem bore into the air expansion chamber above the partition, and an operating connection between the upper end of the valve operating rod and said piston.

4. In the structure of claim 3, an air strainer comprising a cylindrical screen of very fine mesh held by and between the lower end of the cover sleeve and the upper face of the partition.

5. In the structure of claim 3, said operating connection between the upper end of the valve operating rod and said piston comprising a balled head on the rod and a ball socket on the piston seating said head.

6. In a compressed air line drain valve, a closed casing having in the walls thereof an air inlet and an air outlet, a movable wall in the casing separating its interior into an air expansion chamber in communication with the air inlet and an air discharge chamber in communication with the air outlet, said movable wall prior to actuation occupying a first position completely blocking air flow to the air outlet, the range of movement of said wall being from said first position to a second position permitting air flow to said air outlet, said wall being movable between said first and second positions by and in response to a pressure differential between said chambers, a removable partition in sealed engagement with the casing wall in one chamber and dividing that chamber into two parts, said partition including a stem projecting at one end externally through the casing in fluid tight sealed relation thereto, said stem having a bore therein open at one end to the divided chamber in the part thereof housing the movable wall and open at its other end to the atmosphere through the external projection of the stem, first and second drain passages in the stem in axially spaced relation establishing communication between the stem bore and the other part of said partition-divided chamber, and valve means in said stem bore controlling said passages and having an operating connection to said movable wall for actuation thereby in response to its movement.

7. In the structure of claim 6, the externally projecting end of said partition stem being threaded, and a securing nut engaged thereover for tightening against the casing wall to secure the partition in the casing.

8. In combination: a compressed air line drain unit comprising a closed casing having in the walls thereof an air inlet and an air outlet, a movable wall in the casing separating its interior into an air expansion chamber in communication with the air inlet and an air discharge chamber in communication with the air outlet, said movable wall prior to actuation occupying a first position blocking air flow to the air outlet, the range of movement of said wall being from said first position to a second position permitting air flow to said air outlet, said wall being movable between said first and second positions by and in response to a pressure differential between said chambers, a drain aperture in the casing bottom, and valve means controlling said drain aperture and in operating connection with said wall for actuating movement thereby; a removable partition in the casing dividing the air expansion chamber into two parts and having a stem projecting at one end externally of the casing through said drain aperture in fluid tight sealed relation thereto, said stem having an axial bore open at one end to the divided chamber in the part thereof housing the movable wall and open at its other end to the atmosphere through the external projection of the stem, and said stem housing and guiding the valve means.

9. In the structure of claim 6, means biasing said movable wall for return thereof to its first position upon equalization of pressure in both said chambers.

10. In the structure of claim 8, means biasing said movable wall for return thereof to its first position upon equalization of pressure in both said chambers.

References Cited in the file of this patent

UNITED STATES PATENTS

| | | |
|---|---|---|
| 2,602,462 | Barrett | July 8, 1952 |
| 2,619,106 | Wilkerson | Nov. 25, 1952 |